United States Patent [19]

van Ligten

[11] Patent Number: 4,819,592

[45] Date of Patent: Apr. 11, 1989

[54] ENGINE BALANCER

[76] Inventor: Robert H. van Ligten, 3691 Karen Pkwy., Pontiac, Mich. 48054

[21] Appl. No.: 151,028

[22] Filed: Feb. 1, 1988

[51] Int. Cl.⁴ .............................................. F16F 15/26
[52] U.S. Cl. .................................. 123/192 B; 74/604; 74/603
[58] Field of Search ....................... 123/192 B, 192 R; 74/603, 604

[56] References Cited

U.S. PATENT DOCUMENTS

| | | | |
|---|---|---|---|
| 1,163,832 | 12/1915 | Lanchester | 123/192 B |
| 4,000,666 | 1/1977 | Ito et al. | 123/192 B |
| 4,028,963 | 6/1977 | Nakamura et al. | 123/192 B |
| 4,125,036 | 11/1978 | Nakamura et al. | 123/192 B |
| 4,154,206 | 5/1979 | LaSalvar et al. | 123/192 B |
| 4,480,607 | 11/1984 | Tsai et al. | 123/192 B |
| 4,489,683 | 12/1984 | Tsai et al. | 123/192 B |
| 4,598,671 | 7/1986 | Glück et al. | 123/192 B |
| 4,651,689 | 3/1987 | Feichtinger | 123/192 B |
| 4,688,528 | 8/1987 | Nivi et al. | 74/604 |

Primary Examiner—Raymond A. Nelli
Attorney, Agent, or Firm—Jones, Day, Reavis & Pogue

[57] ABSTRACT

A balancer mass is reciprocated linearly in the plane of the piston/cylinders of a four cylinder in-line engine by a pair of cams mounted on the crankshaft for rotation therewith. The second order vibrations can be substantially eliminated either by mounting a single balancer of the invention at the center of the crankshaft or by using a pair of balancers mounted one each at opposite ends of the crankshaft. The vibrations can also be substantially reduced by mounting a single balancer at the "free end" of the crankshaft opposite the clutch and flywheel.

30 Claims, 3 Drawing Sheets

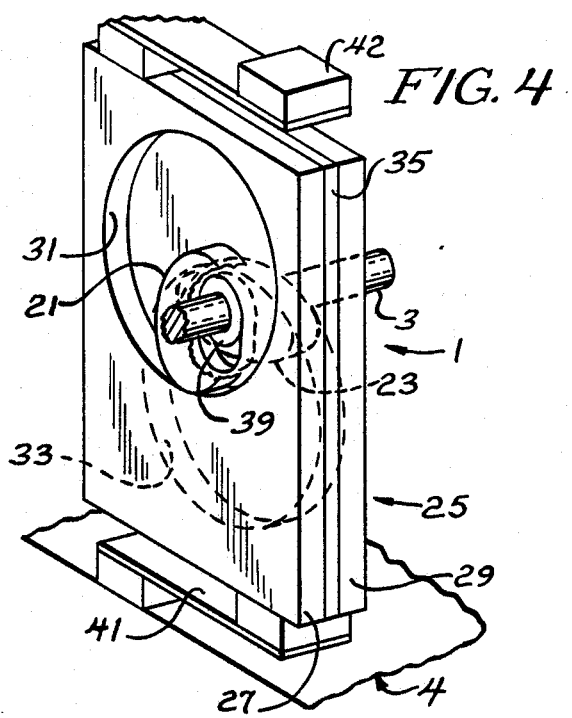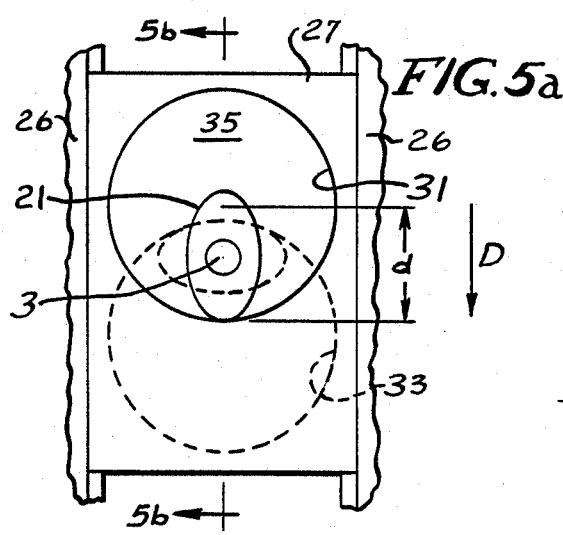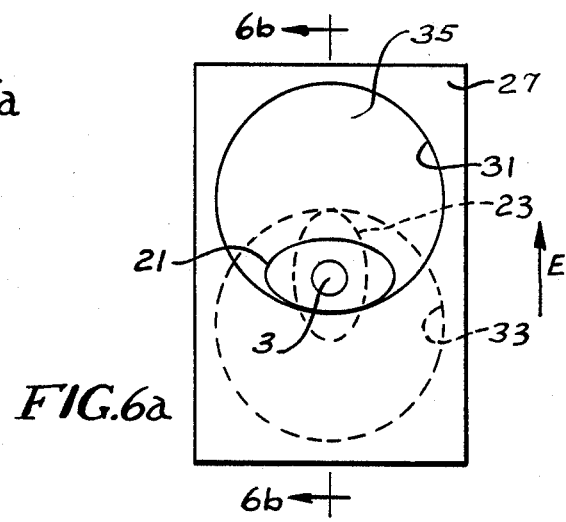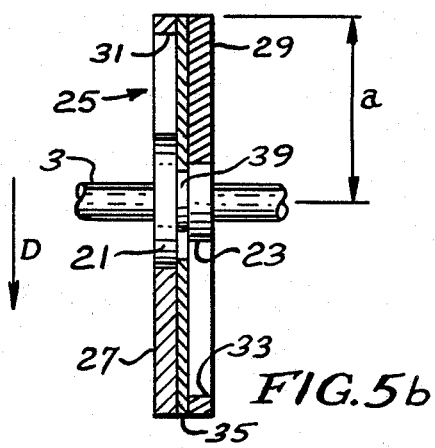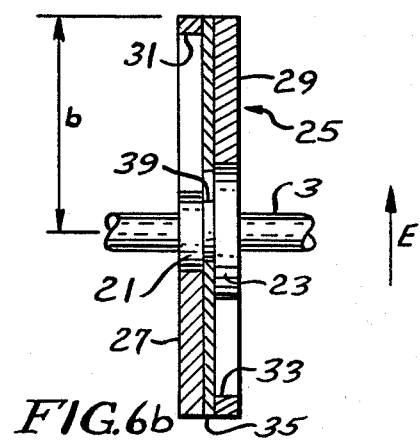

ENGINE BALANCER

BACKGROUND OF THE INVENTION

The invention relates, generally, to a device for balancing second order vibrations of a rotating shaft and, more particularly, to an improved balancer for the crankshaft of a four cylinder in line engine for application in a motor vehicle.

Four cylinder in-line engines have become very popular in recent years, due, in large part, to their fuel economy. In addition to the engines efficiency, the four cylinder in line engine is a simple, low weight, compact design that exhibits superior torque characteristics.

While the engine's popularity has risen because of the aforementioned characteristics, the engine also exhibits undesirable second order vibrations. As is well known in the art, these second order vibrations are due to the fact that the piston rods are of finite length such that the motion of the pistons deviate from pure sinusoidal motion. The resulting imbalance cannot be compensated for by optimal dimensioning as is done with six cylinder engines. Moreover, because the vibration cannot be completely isolated from the body, the vibration results in unacceptably high levels of noise and vibration in the vehicle.

Numerous attempts have been made to eliminate these vibrations. For example, a number of patents assigned to Mitsubishi (U.S. Pat. Nos. 3,995,610, 4,000,666, 4,028,963, 4,074,589, 4,095,579, and 4,125,036) disclose a pair of counter rotating shafts set off from the axis of rotation of the crankshaft and operatively connected thereto by a rotary transmission means such as a chain. German Pat. Nos. 331,328 and 392,149 also show counter rotating shafts having eccentric weights used to balance the Crankshaft A further method for eliminating the second order vibrations is disclosed in German Pat. No. 2,720,284 where the standard crankshaft is replaced by a cam arrangement.

While these balancers are capable of reducing the second order vibrations, a complex and difficult installation procedure is required to arrange these large rotating shafts within the engine block. As a result, the practical applications of the prior art devices are severely limited.

BRIEF DESCRIPTION OF THE INVENTION

The present invention overcomes the above-noted shortcomings of the prior art by providing an engine balancer which reduces or eliminates the second order vibrations and yet is simple in construction and design so as to facilitate its installation either within the engine block or external thereto.

Specifically, the invention includes a balancer mass reciprocated linearly in the plane of the piston/cylinders by a pair of cams mounted on the crankshaft for rotation therewith. The second order vibrations can be virtually eliminated either by mounting a single balancer of the invention at approximately the longitudinal center of the crankshaft or by using a pair of balancers which can be mounted one each at opposite ends of the crankshaft. Moreover, the vibrations can be substantially reduced by mounting a single balancer at the "free end" of the crankshaft, opposite the clutch and gearbox. Thus, the balancer or balancers can be placed on the crankshaft in a number of ways to accomplish the vibration reduction as will hereinafter be explained.

OBJECTS OF THE INVENTION

It is a general object of the invention to provide an improved balancer which eliminates or reduces the second order vibrations of a rotating shaft.

It is a further object of the invention to provide an improved balancer designed specifically to reduce second order vibrations in a four cylinder in line engine.

It is another object of the invention to provide an improved balancer that can simply and easily be used with existing engine designs without the need for extensive modifications.

It is yet another object of the invention to provide an improved balancer in which the phase and direction of the balancing force can be optimized by proper angular positioning of the cams and orientation of the direction of motion of the mass.

Other objects of the invention, in addition to those set forth above, will become apparent to one of ordinary skill in the art from the following detailed description.

BRIEF DESCRIPTION OF THE DRAWINGS

FIG. 4 is a perspective view of the preferred embodiment of the invention;

FIGS. 5a and 5b show detailed front and side section views of the preferred embodiment of the invention, respectively;

FIGS. 6a and 6b show views similar to that of FIGS. 5a and 5b with the crankshaft rotated 90 degrees;

FIG. 7 shows a front view of the spacer plate of the preferred embodiment of the invention;

DETAILED DESCRIPTION OF THE INVENTION

Figure 1:
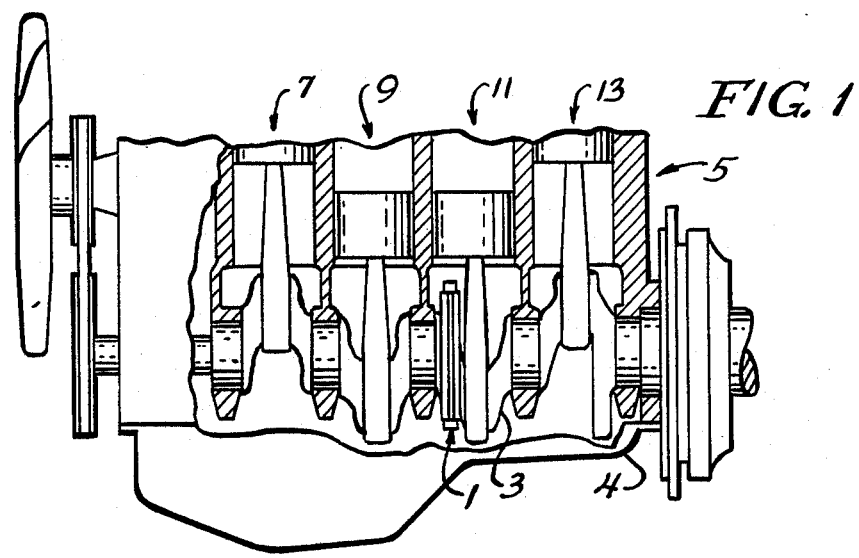
FIG. 1 shows a partially cut away side view of a standard four cylinder in-line engine with the balancer of the present invention arranged at approximately the longitudinal center of the crankshaft.
Figure 2:
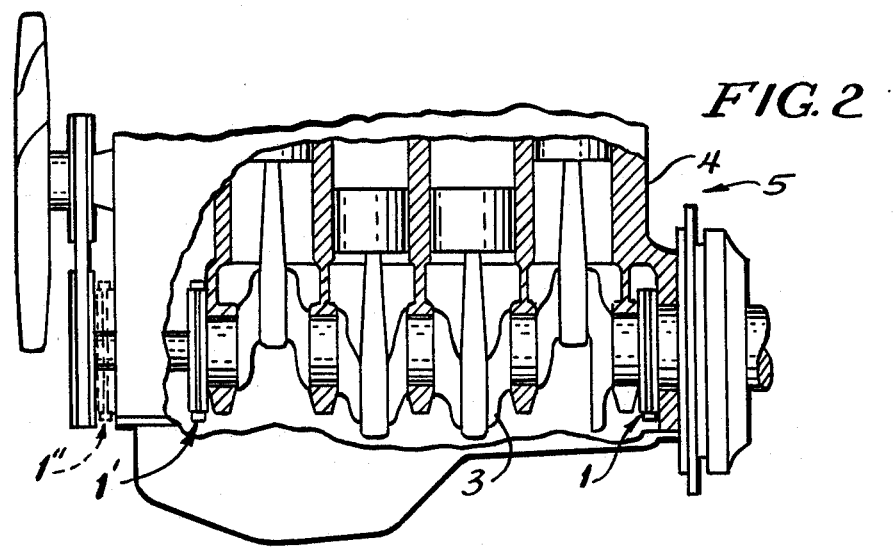
FIG. 2 shows a view similar to that of FIG. 1 with a balancer of the present invention arranged at each end of the crankshaft.

The balancer of the present invention, shown generally, at 1 in FIG. 1, is preferably disposed at the center of the crankshaft 3 of the standard four cylinder in-line engine 5. The balancer in FIG. 1 is optimally positioned at the approximate longitudinal center of the crankshaft 3 such that it is disposed between the first pair of piston/cylinders 7,9 and the second pair of piston/cylinders 11,13. An alternate positioning arrangement for the balancer 1 of the present invention is shown in FIG. 2, where a first balancer 1 is disposed at one end of the crankshaft 3 and a second balancer 1' is disposed at the opposite end of the crankshaft 3. It should be noted that instead of locating the balancers inside of the engine block 4, they could be located outside of the engine block 4 as shown in phantom line position 1" in FIG. 2.

Figure 3:
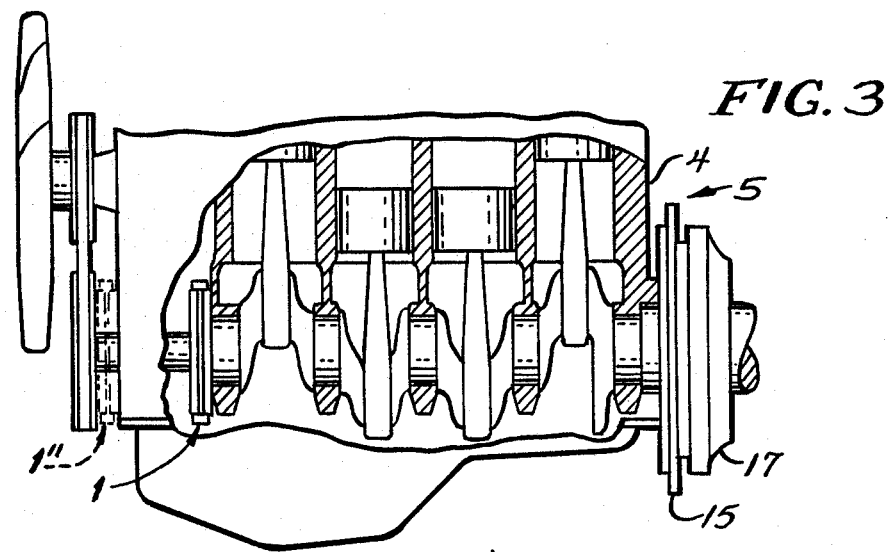
FIG. 3 also shows a view similar to that of FIG. 1 with the balancer of the present invention arranged only at the "free end" of the crankshaft.

In both of the above described arrangements, the balancers of the invention are optimally positioned such that the second order vibrations are virtually eliminated. The compact nature and simple construction of the balancer of the present invention facilitate the installation of the balancers at either the internal or external positions. However, in certain circumstances, it may not be feasible to install the balancer 1 at these optimum positions. Therefore, it is further contemplated that the balancer 1 be located only at the "free end" of the crankshaft opposite the clutch 17 and flywheel 15, as shown in FIG. 3. This arrangement will reduce second order vibrations because the elements mounted on the opposite side of the engine block (i.e. the clutch and gearbox) reduce the vibration of that side of the engine block by virtue of their additional mass. While this placement does not completely eliminate the vibrations, as is the case with the placements shown in FIGS. 1 and 2, it does substantially reduce the vibrations. Moreover, installation of the balancer 1 at the "free end" of the crankshaft, particularly external to the engine block as shown in phantom at 1", is a very simple operation because of the relatively unrestricted access to this end of the crankshaft and the minimal modification required to the engine. As a result, the second order vibrations can be substantially reduced with a very simple modification of the engine using the balancer of the present invention.

Description of the preferred embodiment of the balancer 1 will be made with specific reference to FIGS. 4, 5, and 6. FIG. 4 shows the balancer 1 arranged on the crankshaft 3. It should be noted that the construction of the balancer itself is identical regardless of which of the positioning arrangements (previously discussed with reference to FIGS. 1-3) is used.

The balancer 3 consists of a first cam 21 of approximately elliptical shape and a second identical cam 23 secured to the crankshaft 3 for rotation therewith. The cams 21 and 23 are positioned on the crankshaft 3 so as to be ninety degrees out of phase with one another. A mass 25 is supported by any suitable arrangement of guides, a preferred arrangement of guides will be hereinafter described, such that it linearly reciprocates under the forces generated by the rotation of the cams 21 and 23. The exact shape of the cams 21 and 23 must be determined in connnection with the shape of the surface on the mass 25 with which they contact. The shape of the cams 21 and 23 is chosen so as to ensure a sinusoidal motion of the mass 25 or slight derivations from such motion as desired for optimization purposes.

The mass 25 consists of a pair of plates 27 and 29 of identical configuration. The plates include circular apertures 31 and 33 as shown in FIGS. 4-6. The circular shape of the apertures 31 and 33 in the preferred embodiment is chosen to facilitate the incorporation of bearing structures therein. However, the functional principle of the invention allows the use of apertures of many different shapes. If circular apertures are used, their radius is approximately equal to the arithmetic average of the long and short axes of the cams 21 and 23. In order to arrive at the most compact construction of the illustrated balancer, it is necessary to optimize the major construction parameters such that the larger radius of curvature of the cam is equal to or smaller than the inside radius of the circular apertures 31 and 33. This requirement ensures that a single contact line exists between the cams 21 and 23 and the apertures 31 and 33, respectively. The optimization process will depend on the specific shapes of the cams and apertures selected as will be apparent to one of ordinary skill in the art.

In the assembled balancer the plates 27 and 29 are offset 180 degrees from on another such that the crankshaft 3 passes through the two apertures, as shown in FIGS. 4 and 5. The cams 21 and 23 contact the inner periphery of the the apertures 31 and 33, respectively, to linearly reciprocate the mass 25 in the plane defined by the piston/cylinders 7, 9, 11 and 13. In the preferred embodiment a guide consisting of a pair of leaf springs 41 and 42, fixed at opposite ends to the engine block 4 and mass 25, ensures that the mass reciprocates linearly. Cam 21 contacts the lower edge of aperture 31 to move the mass 25 in the direction of arrow D and cam 23 contacts the upper edge of aperture 33 to move the the mass in the direction of arrow E. A slotted center plate 35 can be disposed between the plates 27 and 29 to further define their location with respect to one another and to define the relative positions of the cams 21 and 23 and mass 25 in the axial direction, if so desired. The center plate 35 has a centrally located aperture 37. See FIG. 7, that is shaped and dimensioned to receive the bearing ring 39, as will hereinafter be described.

FIGS. 5a and 5b show the position of the balancer 1 when cam 21 has moved the mass 25 in the direction of arrow D to the first extreme position through its engagement with aperture 31. FIGS. 6a and 6b show the position of the balancer 1 after the crankshaft has rotated ninety degrees such that cam 23 has moved the mass 25 in the direction of arrow E to its other extreme position through its engagement with aperture 33. The dimensions a and b illustrate the extreme positions of the mass 25 relative to the crankshaft 3, where a<b. Continued rotation of the crankshaft 3 will alternately move the balancer between the first extreme position shown in FIGS. 5a and 5b, and the second extreme position shown in FIGS. 6a and 6b. As is evident from this description the mass 25 reciprocates at two times the frequency of the rotation of the crankshaft 3. A permanent mechanical connection, such as bolts (not shown), connects the plates 27, 29, and 35, together such that the plates 27 and 29 and the center plate 35 move as a unit. When the center plate 35 and bearing ring 39 are used to guide the mass, it is necessary for the aperture 37 to be able to accommodate the bearing ring 39. Thus, the aperture 37 is defined by semi circular arcs 43 and 45 that have the same radius as the bearing 39 and are spaced from one another a distance equal to or greater than the distance traveled by the mass 25, shown in FIG. 7.

Figure 8:
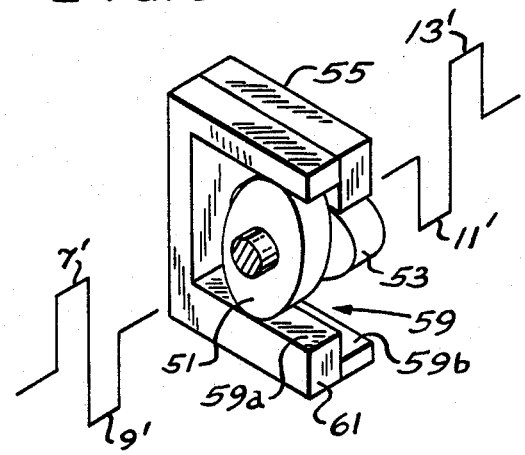
FIG. 8 shows a perspective view of a second embodiment of the invention illustrating the underlying principal of the invention.

A second more rudimentary embodiment of the invention, illustrating its functional principle more clearly, is shown in FIGS. 8, 9, and 10, and includes a pair of cams 51 and 53 mounted on the crankshaft 3 in the same manner as in the first embodiment. A mass 55 is supported by guides (not shown) for linear reciprocating movement in the plane of the piston/cylinders 7', 9', 11', and 13'. Specifically, the mass 55 includes a pair of contact surfaces 57 and 59 having stepped portions 57a, 57b and 59a, 59b, respectively. In the illustrated embodiment, the mass 55 is composed of two pieces 61 and 63 as a manufacturing expedient; however, it is also possible to construct the mass 55 of a single piece without departing from the scope of the invention. Cam 51 contacts surface 59a to move the mass 55 in the direction of arrow A and cam 53 contacts surface 57a to move the mass 55 in the direction of arrow B.

Figure 9A:
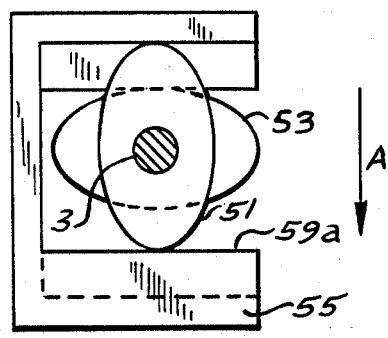
FIGS. 9a and 10a show front and side views of the embodiment of FIG. 8.
Figure 9B:
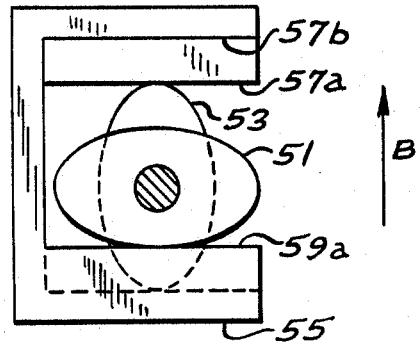
FIGS. 9b and 10b show front and side views of the balancer similar to those of FIGS. 9a and 10a with the crankshaft rotated 90°.
Figure 10A:
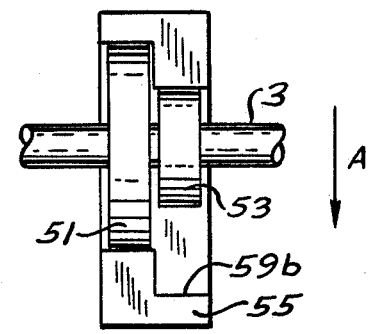
Figure 10B:
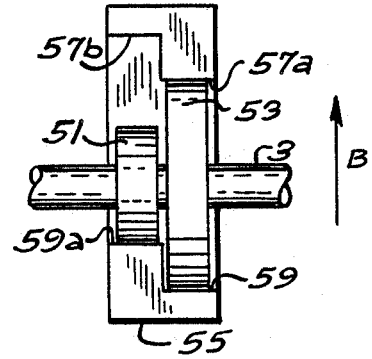

The rotation of the cams 51 and 53 and the corresponding movement of the mass 55 is shown in FIGS. 9 and 10. FIGS. 9a and 10a show the mass 55 in its first extreme position with the cam 51 contacting the surface 59a and FIGS. 9b and 10b show the position of the mass 55 in the other extreme position (after the crankshaft 3 and the cams 51 and 53 have rotated ninety degrees from the positions shown in FIGS. 9a and 10a) with the cam 53 contacting the surface 57a. Continued rotation of the crankshaft 3 will alternately move the balancer 1 between these extreme positions. As is evident from this description, the mass 55 moves in the plane of the piston/cylinders at twice the frequency of rotation of the crankshaft 3. Moreover, surfaces 57a and 59a are contacted by cams 51 and 53, respectively, such that the mass 55 is moved in both linear directions by the positive force of the cams. However, the two cam system could be replaced by a single cam for driving the mass 55 in one of the two linear directions and a spring for moving the cam in the opposite linear direction, if so desired.

In either of the disclosed embodiments the direction of motion of the mass can be adjusted to optimize the direction of the balancing force. For example, the guides 41 and 42, illustrated in FIG. 4, could be made movable so as to optimally position the mass. The orientation of the cams on the crankshaft, while always maintaining a 90° difference therebetween, could also be adjusted in order to optimize the phase of the balancing force.

Although the invention has been described in a preferred and an illustrative form with a certain degree of particularity, it is to be understood that the present disclosure has been made by way of example only. Numerous changes in the details and construction of the combination and arrangement of parts will be apparent without departing from the spirit and scope of the invention. The breadth of the invention should be measured by reference to the appended claims.

What is claimed is:

1. An improved balancer for reducing vibration generated by a rotating shaft comprising:
   a cam means secured to rotating shaft comprising at least one approximately elliptical cam offset from another approximately elliptical cam 90 degrees; and
   a mass having a means for contacting said cam means such that the mass is linearly reciprocated at twice the rotational frequency of the shaft.

2. An improved balancer according to claim 1, wherein the means for contacting the cam means includes two contact surfaces where each contact surface is engaged by one of said approximately elliptical cams such that the mass is moved by the positive force of the approximately elliptical cams in both of the linearly reciprocating directions.

3. An improved balancer according to claim 1, wherein said mass is comprised of two elements where each element is formed with one of said contact surfaces.

4. An improved balancer according to claim 2, wherein said contact surfaces are formed as an arc of a circle.

5. An improved balancer according to claim 2, wherein said contact surfaces are planar.

6. An internal combustion engine comprising:
   an engine block;
   a plurality of pistons contained in cylinders arranged in the engine block and connected to a crankshaft such that reciprocation of the pistons within the cylinder results in rotation of the crankshaft; and
   a balancer means for substantially eliminating or reducing the second order vibrations of the rotating crankshaft comprising a cam means secured to the crankshaft, said cam means including a first substantially elliptical cam offset from a second substantially elliptical cam by 90 degrees, and a mass having a means for contacting said cam means such that the mass is linearly reciprocated at twice the rotational frequency of the crankshaft.

7. An internal combustion engine according to claim 6, wherein the balancer means consists of a single balancer mounted to the crankshaft at approximately the longitudinal center thereof.

8. An internal combustion engine according to claim 6, wherein the balancer means consists of a single balancer mounted at the free end of the crankshaft opposite the clutch and flywheel of the engine.

9. An internal combustion engine according to claim 8, wherein the balancer is located external to the engine block.

10. An internal combustion engine according to claim 8, wherein the balancer is located internally of the engine block.

11. An internal combustion engine according to claim 6, wherein the balancer means consists of a two balancers mounted one each at opposite ends of the crankshaft.

12. An internal combustion engine according to claim 11, wherein the balancers are located external to the engine block.

13. An internal combustion engine according to claim 11, wherein the balancers are located internally of the engine block.

14. An internal combustion engine according to claim 6, wherein the mass includes two contact surfaces where each contact surface is engaged by one of said cams such that the rotation of the cams linearly reciprocates the mass in the plane of the piston/cylinders.

15. An internal combustion engine according to claim 14, wherein the contact surfaces are formed as the arc of a circle.

16. An internal combustion engine according to claim 14, further including a means for guiding the mass along a linear path.

17. An internal combustion engine according to claim 16, wherein the guide means includes a pair of springs mounted between the mass and engine block.

18. An internal combustion engine according to claim 17, wherein the springs are mounted to the mass on opposite sides of the crankshaft.

19. An internal combustion engine according to claim 14, wherein the mass includes two plates each of the plates having one of said contact surfaces formed thereon, and a center plate disposed between the two plates to locate the plates relative to the position of said cams.

20. An internal combustion engine according to claim 19, wherein the contact surfaces are circular apertures.

21. An internal combustion engine according to claim 19, wherein said center plate has an aperture through which the crank shaft passes.

22. An improved engine balancer for reducing vibrations generated by the rotating crankshaft of the engine comprising:

cam means secured to the crankshaft including a first approximately elliptical cam surface offset 90 degrees from a second approximately elliptical cam surface; and a mass having means for contacting said first and second cam surfaces such that the rotation of said crankshaft causes the mass to be reciprocated at twice the rotational frequency of the shaft.

23. The improved engine balancer according to claim 22, wherein said means for contacting the first and second cam surfaces comprises first and second contact surfaces where each contact surface is engaged by one of said cam surfaces.

24. The improved engine balancer according to claim 23, wherein said contact surfaces are formed internally of said mass such that the mass substantially surrounds the crankshift.

25. The improved engine balancer according to claim 23, wherein said contact surfaces are formed on the arc of a circle.

26. The improved engine balancer according to claim 23, wherein said contact surfaces are planar.

27. The improved engine balancer according to claim 22, wherein the balancer is mounted at the free end of the crankshaft opposite the clutch and flywheel of the engine.

28. An internal combustion engine comprising:
an engine block;
a plurality of pistons contained in cylinders arranged in-line in the engine block and connected to a crankshaft such that reciprocation of the pistons within the cylinders results in rotation of the crankshaft; and a balancer means mounted on the crankshaft to substantially eliminate or reduce the second order vibrations of the rotating crankshaft;
wherein the balancer means consists of a single balancer mounted to the crankshaft at approximately the longitudinal center thereof.

29. An internal combustion engine comprising:
an engine block;
a plurality of pistons contained in cylinders arranged in-line in the engine block and connected to a crankshaft such that reciprocation of the pistons within the cylinders results in rotation of the crankshaft; and a balancer means mounted on the crankshaft to substantially eliminate or reduce the second order vibrations of the rotating crankshaft;
wherein the balancer means consists of a two balancers mounted one each at opposite ends of the crankshaft.

30. An internal combustion engine comprising:
an engine block;
a plurality of pistons contained in cylinders arranged in-line in the engine block and connected to a crankshaft such that reciprocation of the pistons within the cylinders results in rotation of the crankshaft; and a balancer means mounted on the crankshaft to substantially eliminate or reduce the second order vibrations of the rotating crankshaft;
wherein the balancer means consists of a single balancer mounted at the free end of the crankshaft opposite the clutch and flywheel.

* * * * *